(12) United States Patent
Dalfra

(10) Patent No.: US 11,106,215 B2
(45) Date of Patent: Aug. 31, 2021

(54) AUTOMATIC MOVING DEVICE, AUTOMATIC WORKING SYSTEM AND CONTROL METHOD THEREOF

(71) Applicant: Positec Power Tools (Suzhou) Co., Ltd., Suzhou (CN)

(72) Inventor: Davide Dalfra, Villimpenta (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 183 days.

(21) Appl. No.: 16/432,433

(22) Filed: Jun. 5, 2019

(65) Prior Publication Data
US 2019/0286158 A1   Sep. 19, 2019

Related U.S. Application Data

(63) Continuation of application No. PCT/CN2017/070182, filed on Jan. 4, 2017.

(30) Foreign Application Priority Data

| Dec. 9, 2016 | (CN) | 201611131568.2 |
| Dec. 21, 2016 | (CN) | 201611194236.9 |
| Dec. 30, 2016 | (CN) | 201611262890.9 |

(51) Int. Cl.
G05D 1/02    (2020.01)
G05D 1/00    (2006.01)
G01C 21/00   (2006.01)

(52) U.S. Cl.
CPC .......... *G05D 1/0259* (2013.01); *G01C 21/00* (2013.01); *G05D 1/0088* (2013.01); *G05D 2201/0208* (2013.01)

(58) Field of Classification Search
CPC .............. G05D 1/0259; G05D 1/0088; G05D 2201/0208; G05D 1/0265; G05D 1/0225; G05D 1/0268; G01C 21/00
See application file for complete search history.

(56) References Cited

U.S. PATENT DOCUMENTS

| 7,706,917 B1* | 4/2010 | Chiappetta ........... G05D 1/0246 |
| | | 700/245 |
| 2010/0082193 A1* | 4/2010 | Chiappetta ........... G01C 21/206 |
| | | 701/24 |

(Continued)

FOREIGN PATENT DOCUMENTS

| CN | 101420209 A | 4/2009 |
| CN | 202126267 U | 1/2012 |

(Continued)

OTHER PUBLICATIONS

Machine Translation of CN 103543745 retrieved from Espacenet on Jan. 29, 2021 (Year: 2021).*

(Continued)

*Primary Examiner* — Thomas Ingram
(74) *Attorney, Agent, or Firm* — Middleton Reutlinger

(57) ABSTRACT

A control method of an automatic working system, which comprises the following steps: a signal generating device generates a boundary signal; the boundary signal flows through the boundary wire to generate an electromagnetic field; a detecting device on an automatic moving device detects the electromagnetic field to generate a detection signal, amplify the detection signal to form a gain signal, compare an feature point of the gain signal with a preset condition, the preset condition comprising: the feature point is lower than an upper threshold value and higher than a lower threshold value, then automatically adjust the gain signal according to a comparing result, such that the feather point of the gain signal formed after adjusting accords with the preset condition, further to process the gain signal, An automatic working system and an automatic moving device also be disclosed.

20 Claims, 11 Drawing Sheets

(56) References Cited

U.S. PATENT DOCUMENTS

2016/0109241 A1  4/2016 Eguchi et al.
2016/0377688 A1* 12/2016 Kleiner .................... G01B 7/30
                                                 324/202

FOREIGN PATENT DOCUMENTS

| CN | 102889850 A | 1/2013 |
| CN | 103543745 A | 1/2014 |
| CN | 106168484 A | 11/2016 |
| EP | 3056959 A1 | 8/2016 |

OTHER PUBLICATIONS

State Intellectual Property Office of the P.R. China, International Search Report and Written Opinion (English translation included) for PCT/CN2017/070182 dated Aug. 17, 2017.

* cited by examiner

AUTOMATIC MOVING DEVICE, AUTOMATIC WORKING SYSTEM AND CONTROL METHOD THEREOF

TECHNICAL FIELD

The present invention relates to an automatic working system, in particular to a system controlling an automatic moving device to work in a working region.

The present invention relates to a control method, in particular to a control method controlling an automatic moving device to work in a working region.

The present invention relates to an automatic moving device, in particular to an automatic moving device working and moving in a working region automatically.

BACKGROUND

Along with the development of science and technology, an intelligent automatic moving device is known by people very well, since the automatic moving device can execute preset related tasks by an automatically preset program without artificial operation and intervention, and is thus industrial application and application on household products is very wide. The industrial application comprises for example robots executing various functions, the application on the household products comprises for example a mower, a dust collector and the like, and these intelligent automatic moving devices greatly save people's time and bring great convenience to industrial production and household life.

Such automatic moving device usually moves in a preset working region automatically without leaving the preset working region. An outer boundary of the preset working region is determined by adopting a boundary wire generally. The boundary wire is a common wire generally.

A current flows by the boundary wire marking the outer boundary of the working region. A generated electric field or magnetic field can be detected by a proper sensor in the automatic moving device, a detected signal is then transmitted to a processor built in the automatic moving device, and a processor compares the obtained signal with a preset judging criterion in a memory, and thus obtains whether the automatic moving device is in the working region or not.

SUMMARY

As shown in FIG. 1, in a simple embodiment, the automatic working system comprises a signal generating device 80', a boundary wire 50' electrically connected to the signal generating device, and an automatic moving device 10'. The boundary wire 50' defined a working region 30' surrounded by the boundary wire 50' and a non-working region 70' located outside a circle of the boundary wire 50'. The signal generating device 80' generates a periodic current signal SS as shown in FIG. 2. The current signal SS will generate an electromagnetic field 90' changed by taking the boundary wire 50' as a center when flows through the boundary wire 50'. At any moment, the polarity of the electromagnetic field 90' in the working region 30' is opposite to that in the non-working region 70'.

The automatic moving device 10' further comprises a signal detecting device 20' and a processor (not shown). The signal detecting device 20' is usually a sensing coil, which generates a detection signal by sensing the changed electromagnetic field 90', such as an AC voltage or AC current. The processor receives and processes the detection signal, and compares the detection signal with a threshold value preset in the processor, when an amplitude of the voltage or current exceeds the threshold value, the processor indicates the automatic moving device 10' to get away from the boundary wire 50' of the working region. When the automatic working device crosses the boundary wire 50' to enter the non-working region 70', since the polarity of the magnetic field 90' is reversed, a phase of the detection signal sensed by a signal detecting device 110' is also reversed. The processor judges that the automatic working device is in the non-working region 70' by recognizing that the phase direction of the detection signal is different from a preset phase direction.

In an actual working scenario, the automatic working device 10' is necessarily provided with a motor driving the automatic working device to walk and/or a motor driving mowing or dust collecting and other working parts of the automatic working device to work, and the operation of the motor will generate an electromagnetic field. Such electromagnetic field will be sensed by the signal detecting device 110' to generate a voltage or current signal. Therefore, the detection signal received by the processor actually contains an interference signal brought by the motor. When judging and controlling by adopting the interfered detection signal, the processor often misjudges the inside and outside and sends a control command not according with an actual condition.

In the actual working scenario, when different adjacent working regions exist, the electromagnetic fields generated by the boundary wire of different working regions will cross. Therefore, the detection signals obtained by sensing of the automatic working devices in respective working regions necessarily contain the interference brought by the adjacent electromagnetic fields. Therefore, the detection signals received by the respective processors actually contain the interference signals brought by the electromagnetic fields in the adjacent working regions. When judging and controlling by adopting the interfered detection signal, the processor often misjudges the inside and outside and sends a control command not according with an actual condition.

In the actual working scenario, the automatic working device 10' necessarily works in a free space, while various electromagnetic waves sent by various radio devices or other types of devices exist in the free space. A certain electromagnetic signal is possibly sensed by the signal detecting device 110' at a certain moment. Therefore, the detection signal SJ' received by the processor actually contains the interference signal brought by electromagnetic waves in the free space. When judging and controlling by adopting the interfered detection signal SJ', the processor often misjudges the inside and outside and sends a control command not according with an actual condition.

Therefore, it is necessary to design a control method capable of simply and effectively eliminating or reducing various interference signals mentioned above and an automatic working system applying such control method.

The embodiments of the invention solve a technical problem about providing an automatic working system, a control method and an automatic moving device, which can automatically adjust the size of a detection signal and eliminating or reducing an interference signal.

In order to solve the above technical problem, a technical solution of the embodiments of present invention is: a control method of an automatic working system, said automatic working system comprises a signal generating device for generating a current signal, said current signal generating an electromagnetic field when flowing through a boundary wire; and an automatic moving device, said automatic moving device having at least one detecting device for detecting said electromagnetic field; the control method comprising the following steps:

detecting said electromagnetic field, and generating at least one detection signal;

amplifying said at least one detection signal to form at least one gain signal;

determining a feature point of said gain signal according to a preprocessing condition, said preprocessing condition comprising that said feature point is a point in a function relation with an extreme point of said gain signal;

comparing said at least one feature point with a preset condition, said preset condition comprising that said feature point is lower than an upper threshold value and higher than a lower threshold value;

if said feature point is higher than said upper threshold value, then reduce an amplification factor of said gain signal, if said feature point is lower than said lower threshold value, then increase an amplification factor of said gain signal, such that said gain signal formed after adjusting accords with said preset condition.

In one of the embodiments, said feature point comprises an extreme point of said gain signal, and said extreme point comprises a peak value and/or a valley value.

In one of the embodiments, when one of said peak value or said valley value does not accord with said preset condition, then adjust said the amplification factor of said gain signal.

In one of the embodiments, said upper threshold value and said lower threshold value are fixed values.

In one of the embodiments, said automatic moving device further comprises a processor for processing the at least one gain signal, and said preset condition is disposed in said processor.

In one of the embodiments, the step of amplifying said at least one detection signal to form at least one gain signal can be performed by a programmable gain amplifier.

In one of the embodiments, the step of amplifying said at least one detection signal to form at least one gain signal can be performed by a fixed gain amplifier.

In one of the embodiments, a level of the amplification factor of said programmable gain amplifier are one of 2-6 levels.

In one of the embodiments, a level of the amplification factor of said programmable gain amplifier is are 5 levels.

In one of the embodiments, said amplification factor of said programmable gain amplifier is ½ to 16 times of said gain signal.

In one of the embodiments, after said gain signal according with said preset condition is output, further comprising an analog to digital conversion step for converting said gain signal into a digital signal.

In one of the embodiments, after said digital signal is formed, further comprising a denoising step for removing an interference signal of said digital signal.

In one of the embodiments, after said denoising step, further comprising a judging step, for judging that said detecting device is in or outside said boundary wire based on a denoised digital signal and forming at least one moving signal, and after said judging step, further comprising a driving step for driving said automatic moving device to move according to said at least one moving signal.

In one of the embodiments, said at least one detecting device comprises a first detecting device and a second detecting device; said first detecting device and said second detecting device detect said electromagnetic field to generate a first detection signal and a second detection signal respectively.

In one of the embodiments, amplifying said first detection signal and said second detection signal to form a first gain signal and a second gain signal, compare said first detection signal and said second detection signal with said preset condition respectively, and adjust amplification factors of said first gain signal and said second gain signal are respectively according to a comparing result.

The embodiments of the present invention also provide a technical solution, an automatic working system, comprising:

a signal generating device, configured to generate a current signal;

a boundary wire, forming an electric loop with said signal generating device, said current signal flowing through said boundary wire to generate an electromagnetic field;

an automatic moving device, automatically moving and working in a working region defined by said boundary wire, said automatic moving device comprising at least one detecting device, further comprising an adjusting module and a comparing module;

said at least one detecting device detects said electromagnetic field to generate at least one detection signal, and said adjusting module amplifies said at least one detection signal to form at least one gain signal;

determining a feature point of said gain signal according to a preprocessing condition, and said preprocessing condition comprises that said feature point is a point in a function relation with an extreme point of said gain signal;

said comparing module compares said at least one feature point with a preset condition, said preset condition comprising that said feature point is lower than an upper threshold value and higher than a lower threshold value;

if said feature point is higher than said upper threshold value, then said adjusting module reduces an amplification factor of said gain signal, if said feature point is lower than said lower threshold value, then said adjusting module increases an amplification factor of said gain signal, such that said gain signal formed after adjusting accords with said preset condition.

In one of the embodiments, said feature point comprises an extreme point of said gain signal, and said extreme point comprises a peak value and/or a valley value.

In one of the embodiments, when one of said peak value or said valley value does not accord with said preset condition, said adjusting module adjusts the amplification factor of said gain signal.

In one of the embodiments, said upper threshold value and said lower threshold value are fixed values.

In one of the embodiments, said automatic moving device further comprises a processor for processing said at least one gain signal, and said preset condition is disposed in said processor.

In one of the embodiments, said adjusting module comprises a programmable gain amplifier.

In one of the embodiments, said adjusting module comprises a fixed gain amplifier.

In one of the embodiments, a level of the amplification factor of said programmable gain amplifier are one of 2-6 levels.

In one of the embodiments, a level of the amplification factor of said programmable gain amplifier are 5 levels.

In one of the embodiments, said amplification factor of said programmable gain amplifier is ½ to 16 times of said gain signal.

In one of the embodiments, an analog to digital converter is electrically connected to said adjusting module, configured to convert said gain signal into a digital signal.

In one of the embodiments, said analog to digital converter is a differential analog to digital converter.

In one of the embodiments, a denoising module is electrically connected to said analog to digital converter, configured to remove an interference signal of said digital signal.

In one of the embodiments, a judging module is electrically connected to said denoising module, configured to judge that said detecting device is in or outside said boundary wire based on a denoised digital signal and then forms at least one moving signal.

In one of the embodiments, a controller is electrically connected to said judging module, configured to receive said moving signal to drive said automatic moving device to move.

In one of the embodiments, said comparing module, said adjusting module, said analog to digital converter, said denoising module and said judging module are integrated in said processor.

In one of the embodiments, said at least one detecting device comprises a first detecting device and a second detecting device; said first detecting device and said second detecting device detect said electromagnetic field to generate a first detection signal and a second detection signal respectively.

In one of the embodiments, said adjusting module amplifies said first detection signal and said second detection signal to form a first gain signal and a second gain signal respectively, said comparing module compares said first gain signal and said second gain signal with said preset condition respectively, and said adjusting module adjusts an amplification factor of said first gain signal and said second gain signal respectively according to a comparing result.

The embodiments of the present invention also provide a technical solution, an automatic moving device, comprising:

at least one detecting device, at least one fixed gain amplifier, further comprising an adjusting module and a comparing module;

said at least one detecting device detects electromagnetic field to generate at least one detection signal, said at least one fixed gain amplifier amplifies said at least one detection signal to form at least one gain signal;

determining a feature point of said gain signal according to a preprocessing condition, said preprocessing condition comprises that said feature point is a point in a function relation with an extreme point of said gain signal;

said comparing module compares said at least one feature point with a preset condition, said preset condition comprising that said feature point is lower than an upper threshold value and higher than a lower threshold value;

if said feature point is higher than said upper threshold value, then said adjusting module reduces an amplification factor of said gain signal, if said feature point is lower than said lower threshold value, then said adjusting module increases an amplification factor of said gain signal, such that said gain signal formed after adjusting accords with said preset condition.

In one of the embodiments, the feature point comprises an extreme point of said gain signal, and said extreme point comprises a peak value and/or a valley value.

In one of the embodiments, when one of said peak value or the valley value does not accord with said preset condition, said adjusting module adjusts said amplification factor of said gain signal.

In one of the embodiments, said upper threshold value and said lower threshold value are fixed values.

In one of the embodiments, said automatic moving device further comprises a processor for processing said at least one gain signal, and said preset condition is disposed in said processor.

In one of the embodiments, a level of said amplification factor of said programmable gain amplifier are one of 2-6 levels, and said amplification factor of said programmable gain amplifier is ½ to 16 times of said gain signal.

In one of the embodiments, said adjusting module comprises a programmable gain amplifier.

In one of the embodiments, said adjusting module comprises a fixed gain amplifier.

In one of the embodiments, an analog to digital converter electrically connected to said adjusting module, configured to convert said gain signal into a digital signal.

In one of the embodiments, said analog to digital converter is a differential analog to digital converter.

The embodiments of present invention also provide a technical solution, a control method of an automatic working system, said automatic working system comprises: a signal generating device for generating a current signal, said current signal generating an electromagnetic field when flowing through a boundary wire; and an automatic moving device, said automatic moving device having at least one detecting device for detecting the electromagnetic field; comprising the following steps:

detecting said electromagnetic field, and generating at least one detection signal;

amplifying said at least one detection signal to form at least one gain signal;

comparing at least one extreme point of said gain signal with a preset condition, said preset condition comprising that said extreme point is lower than an upper threshold value and higher than a lower threshold value;

if said extreme point is higher than said upper threshold value, then reduce an amplification factor of said gain signal, if said extreme point is lower than said lower threshold value, then increase an amplification factor of said gain signal, such that the gain signal formed after adjusting accords with said preset condition.

In one of the embodiments, said extreme point comprises a peak value and/or a valley value of said gain signal.

In one of the embodiments, when one of said peak value or said valley value does not accord with said preset condition, the amplification factor of said gain signal is adjusted.

In one of the embodiments, said upper threshold value and said lower threshold value are fixed values.

In one of the embodiments, said automatic moving device further comprises a processor for processing the at least one gain signal, and said preset condition is disposed in said processor.

In one of the embodiments, the step of amplifying said at least one detection signal to form at least one gain signal can be performed by a programmable gain amplifier.

In one of the embodiments, the step of amplifying said at least one detection signal to form at least one gain signal can be performed by a fixed gain amplifier.

In one of the embodiments, a level of the amplification factor of said programmable gain amplifier are one of 2-6 levels.

In one of the embodiments, a level of the amplification factor of said programmable gain amplifier are 5 levels.

In one of the embodiments, the amplification factor of said programmable gain amplifier is ½ to 16 times of said gain signal.

In one of the embodiments, after said gain signal according with said preset condition is output, further comprising an analog to digital conversion step for converting said gain signal into a digital signal.

In one of the embodiments, after said digital signal is formed, further comprising a denoising step for removing an interference signal of said digital signal.

In one of the embodiments, after said denoising step, further comprising a judging step, for judging that said detecting device is in or outside the boundary wire based on a denoised digital signal and forming at least one moving signal, and after said judging step, further comprising a driving step for driving said automatic moving device to move according to said at least one moving signal.

In one of the embodiments, said at least one detecting device comprises a first detecting device and a second detecting device; said first detecting device and said second detecting device detect said electromagnetic field to generate a first detection signal and a second detection signal respectively.

In one of the embodiments, said first detection signal and said second detection signal are amplified to form a first gain signal and a second gain signal, which are compared with said preset condition respectively, and amplification factors of said first gain signal and said second gain signal are respectively adjusted according to a comparing result.

The embodiments of the present invention also provide a technical solution, an automatic working system, comprising:

a signal generating device, configured to generate a current signal;

a boundary wire, forming an electric loop with said signal generating device, the current signal flowing through a boundary wire to generate an electromagnetic field;

an automatic moving device, automatically moving and working in a working region planned by said boundary wire;

said automatic moving device comprising at least one detecting device, and further comprising a comparing module and an adjusting module;

said at least one detecting device detects said electromagnetic field to generate at least one detection signal, and said adjusting module amplifies said at least one detection signal to form at least one gain signal;

said comparing module compares at least one extreme point of said gain signal with a preset condition, said preset condition comprising that said extreme point is lower than an upper threshold value and higher than a lower threshold value;

if said extreme point is higher than said upper threshold value, then said adjusting module reduces an amplification factor of said gain signal, if said extreme point is lower than said lower threshold value, then said adjusting module increases an amplification factor of said gain signal, such that said gain signal formed after adjusting accords with said preset condition.

In one of the embodiments, said extreme point comprises a peak value and/or a valley value of said gain signal.

In one of the embodiments, when one of said peak value or said valley value does not accord with said preset condition, said adjusting module adjusts the amplification factor of said gain signal.

In one of the embodiments, said upper threshold value and said lower threshold value are fixed values.

In one of the embodiments, said automatic moving device further comprises a processor for processing said at least one gain signal, and said preset condition is disposed in said processor.

In one of the embodiments, said adjusting module comprises a programmable gain amplifier.

In one of the embodiments, said adjusting module comprises a fixed gain amplifier.

In one of the embodiments, a level of the amplification factor of said programmable gain amplifier are one of 2-6 levels.

In one of the embodiments, a level of the amplification factor of said programmable gain amplifier are 5 levels.

In one of the embodiments, the amplification factor of said programmable gain amplifier is ½ to 16 times of said gain signal.

In one of the embodiments, an analog to digital converter is electrically connected to said adjusting module, configured to convert said gain signal into a digital signal.

In one of the embodiments, said analog to digital converter is a differential analog to digital converter.

In one of the embodiments, a denoising module is electrically connected to said analog to digital converter, configured to remove an interference signal of said digital signal.

In one of the embodiments, a judging module is electrically connected to said denoising module, configured to judge that said detecting device is in or outside said boundary wire based on a denoised digital signal and then forms at least one moving signal.

In one of the embodiments, a controller is electrically connected to said judging module, configured to receive said moving signal to drive said automatic moving device to move.

In one of the embodiments, said comparing module, said adjusting module, said analog to digital converter, said denoising module and said judging module are integrated in said processor.

In one of the embodiments, said at least one detecting device comprises a first detecting device and a second detecting device; said first detecting device and said second detecting device detect said electromagnetic field to generate a first detection signal and a second detection signal respectively.

In one of the embodiments, said adjusting module amplifies said first detection signal and said second detection signal to form a first gain signal and a second gain signal respectively, said comparing module compares said first gain signal and said second gain signal with said preset condition respectively, and said adjusting module adjusts an amplification factor of said first gain signal and said second gain signal respectively according to a comparing result.

The embodiments of the present invention also provide a technical solution, an automatic moving device, comprising:

at least one detecting device, at least one fixed gain amplifier, a comparing module and an adjusting module;

said at least one detecting device detects the electromagnetic field to generate at least one detection signal, said at least one fixed gain amplifier amplifies said at least one detection signal to form at least one gain signal;

said comparing module compares at least one extreme point of said gain signal with a preset condition, said preset condition comprising that said extreme point is lower than an upper threshold value and higher than a lower threshold value;

if said extreme point is higher than said upper threshold value, then said adjusting module reduces an amplification factor of said gain signal, if said extreme point is lower than said lower threshold value, then said adjusting module increases an amplification factor of said gain signal, such that said gain signal formed after adjusting accords with said preset condition.

In one of the embodiments, said extreme point comprises a peak value and/or a valley value of said gain signal.

In one of the embodiments, when one of said peak value or said valley value does not accord with said preset condition, said adjusting modules adjusts the amplification factor of said gain signal.

In one of the embodiments, said upper threshold value and said lower threshold value are fixed values.

In one of the embodiments, said automatic moving device further comprises a processor for processing said at least one gain signal, and said preset condition is disposed in said processor.

In one of the embodiments, the adjusting modules comprises a programmable gain amplifier.

In one of the embodiments, said adjusting modules comprises a fixed gain amplifier.

In one of the embodiments, a level of the amplification factor of said programmable gain amplifier are one of 2-6 levels.

In one of the embodiments, a level of the amplification factor of said programmable gain amplifier are 5 levels.

In one of the embodiments, the amplification factor of said programmable gain amplifier is ½ to 16 times of said gain signal.

In one of the embodiments, an analog to digital converter is electrically connected to said adjusting module, configured to convert said gain signal into a digital signal.

In one of the embodiments, said analog to digital converter is a differential analog to digital converter.

In one of the embodiments, a denoising module is electrically connected to said adjusting module, configured to remove an interference signal of said digital signal.

In one of the embodiments, a judging module is electrically connected to said denoising module, configured to judge that said detecting device is in or outside said boundary wire based on a denoised digital signal and then forms at least one moving signal.

In one of the embodiments, a controller is electrically connected to said judging module, configured to receive the moving signal to drive said automatic moving device to move.

In one of the embodiments, said comparing module, said adjusting module, said analog to digital converter, said denoising module and said judging module are integrated in said processor.

In one of the embodiments, said at least one detecting device comprises a first detecting device and a second detecting device; said first detecting device and said second detecting device detect the electromagnetic field to generate a first detection signal and a second detection signal respectively.

In one of the embodiments, said adjusting module amplifies said first detection signal and said second detection signal to form a first gain signal and a second gain signal respectively, said comparing module compares said first gain signal and said second gain signal with said preset condition respectively, and said adjusting module adjusts an amplification factor of said first gain signal and said second gain signal respectively according to a comparing result.

In one of the embodiments, said first detecting device and said second detecting device are symmetric about a middle axis of said automatic moving device.

The embodiments of the present invention also provide a technical solution, an automatic working system, comprising:

a signal generating device, configured to generate a current signal;

a boundary wire, forming an electric loop with said signal generating device, said current signal flowing through said boundary wire to generate an electromagnetic field;

an automatic moving device, automatically moving and working in a working region planned by said boundary wire, said automatic moving device comprising at least one detecting device, and a processor;

said at least one detecting device detects said electromagnetic field to generate at least one detection signal, said processor comprises a programmable gain amplifier and a comparing module;

said programmable gain amplifier amplifies said at least one detection signal to form at least one gain signal;

said comparing module compares said gain signal with a preset condition, according to a comparing result, said programmable gain amplifier automatically adjust an amplification factor of said gain signal, such that said gain signal formed after adjusting accords with said preset condition.

In one of the embodiments, a controller is electrically connected to said processor, configured to receive a signal output from said processor to drive said automatic moving device to move.

In one of the embodiments, a level of the amplification factor of said programmable gain amplifier are one of 2-6 levels.

In one of the embodiments, a level of the amplification factor of said programmable gain amplifier are 5 levels.

In one of the embodiments, a level of the amplification factor of said programmable gain amplifier is ½ to 16 times of said gain signal.

In one of the embodiments, said preset condition comprises that an extreme point of said gain signal is lower than an upper threshold value and higher than a lower threshold value.

In one of the embodiments, said extreme point comprises a peak value and/or valley value of said gain signal.

In one of the embodiments, when one of said peak value or valley value does not accord with said preset condition, said programmable gain amplifier adjusts the amplification factor of said gain signal.

In one of the embodiments, said upper threshold value and said lower threshold value are fixed values.

In one of the embodiments, said preset condition is disposed in said processor.

In one of the embodiments, an analog to digital converter is electrically connected to said programmable gain amplifier, configured to convert said gain signal into a digital signal.

In one of the embodiments, said analog to digital converter is a differential analog to digital converter.

In one of the embodiments, a denoising module is electrically connected to said analog to digital converter, configured to remove an interference signal of said digital signal.

In one of the embodiments, a judging module is electrically connected to said denoising module, configured to judge that the detecting device is in or outside said boundary wire based on a denoised digital signal and then forms at least one moving signal.

In one of the embodiments, said comparing module, said programmable gain amplifier, said analog to digital converter, said denoising module and said judging module are integrated in said processor.

In one of the embodiments, said at least one detecting device comprises a first detecting device and a second detecting device; said first detecting device and said second detecting device detect said electromagnetic field to generate a first detection signal and a second detection signal respectively.

In one of the embodiments, said fixed gain amplifier amplifies said first detection signal and said second detection signal to form a first gain signal and a second gain signal respectively, said comparing module compares said first gain signal and said second gain signal with said preset condition respectively, and said programmable gain amplifier adjusts an amplification factor of said first gain signal and said second gain signal respectively according to a comparing result.

The embodiments of the present invention also provide a technical solution, an automatic moving device, comprising:

at least one detecting device, at least one fixed gain amplifier and a processor, said processor internally comprises a programmable gain amplifier and a comparing module;

said at least one detecting device detects the electromagnetic field to generate at least one detection signal, said at least one fixed gain amplifier amplifies said at least one detection signal to form at least one gain signal;

said comparing module compares said gain signal with a preset condition, according to a comparing result, said programmable gain amplifier automatically adjusts an amplification factor of said gain signal, such that said gain signal formed after adjusting accords with said preset condition.

In one of the embodiments, a controller is electrically connected to said processor, configured to receive a signal output from said processor to drive said automatic moving device to move.

In one of the embodiments, a level of said amplification factor of said programmable gain amplifier are one of 2-6 levels.

In one of the embodiments, a level of said amplification factor of said programmable gain amplifier are 5 levels.

In one of the embodiments, said amplification factor of said programmable gain amplifier is ½ to 16 times of said gain signal.

In one of the embodiments, said preset condition comprises that an extreme point of said gain signal is lower than said upper threshold value and higher than said lower threshold value.

In one of the embodiments, said extreme point comprises a peak value and/or valley value of said gain signal.

In one of the embodiments, when one of said peak value or said valley value does not accord with said preset condition, said programmable gain amplifier adjusts said amplification factor of said gain signal.

In one of the embodiments, said upper threshold value and said lower threshold value are fixed values.

In one of the embodiments, said preset condition is disposed in said processor.

In one of the embodiments, an analog to digital converter electrically connected to said programmable gain amplifier, configured to convert said gain signal into a digital signal.

In one of the embodiments, said analog to digital converter is a differential analog to digital converter.

In one of the embodiments, a denoising module is electrically connected to said analog to digital converter, configured to remove an interference signal of said digital signal.

In one of the embodiments, a judging module is electrically connected to said denoising module, configured to judge that said detecting device is in or outside said boundary wire based on a denoised digital signal and then forms at least one moving signal.

In one of the embodiments, said comparing module, said programmable gain amplifier, said analog to digital converter, said denoising module and said judging module are integrated in said processor.

In one of the embodiments, said at least one detecting device comprises a first detecting device and a second detecting device; said first detecting device and said second detecting device detect said electromagnetic field to generate a first detection signal and a second detection signal respectively.

In one of the embodiments, said programmable gain amplifier amplifies said first detection signal and said second detection signal to form a first gain signal and a second gain signal respectively, said comparing module compares said first gain signal and said second gain signal with said preset condition respectively, and said programmable gain amplifier adjusts an amplification factor of said first gain signal and said second gain signal respectively according to a comparing result.

In one of the embodiments, said first detecting device and said second detecting device are symmetric about a middle axis of the automatic moving device.

The embodiments of the present invention have the beneficial effects: by recognizing an effective detected signal, a noise interference in the environment and the signal interference in adjacent systems can be effectively removed, and the anti-interference capacity of the automatic working system is improved. The recognition of the effective signal comprises that through a preset upper threshold value and lower threshold value, a feature point of the adjusted detection signal is between the upper threshold value and the lower threshold value, such that the interference signal is effectively removed; the adjusting process of the above detection signal can be automatically adjusted through a programmable gain amplifier, the control algorithm for recognition of the effective signal is effective, simple, and flexible, and not only the efficiency of the automatic working system improved, but also an implementing difficulty of hardware for recognizing the effective signal is reduced.

BRIEF DESCRIPTION OF THE DRAWINGS

The technical problem solved by the embodiments of the present invention, the technical solution and the beneficial effects mentioned above can be clearly obtained through the detailed description on specific embodiments capable of realizing the present invention in combination with the drawings.

The same numbers and signs in the drawings and the specification are used for representing the same or equivalent elements.

| 10/10' | Automatic working device | 30/30' | Working region |
|---|---|---|---|
| 50/50' | Boundary wire | 70/70' | Non-working region |
| 80/80' | Signal generating device | 90/90' | Magnetic field |
| 102 | Shell | 104 | Wheels |
| 110 | Detecting device | 120 | Offset device |
| 1101 | First detecting device | 130 | Processor |
| 1102 | Second detecting device | 140 | Adjusting module |
| 1401 | Programmable gain amplifier | 1402 | Fixed gain amplifier |
| 150 | Differential analog to digital converter | 160 | Controller |

DETAILED DESCRIPTION

The detailed description and technical content about the embodiments of the present invention are explained as follows in combination with the drawings, but appended drawings are merely used for providing reference and explanation rather than limiting the embodiments of the present invention.

Figure 1:
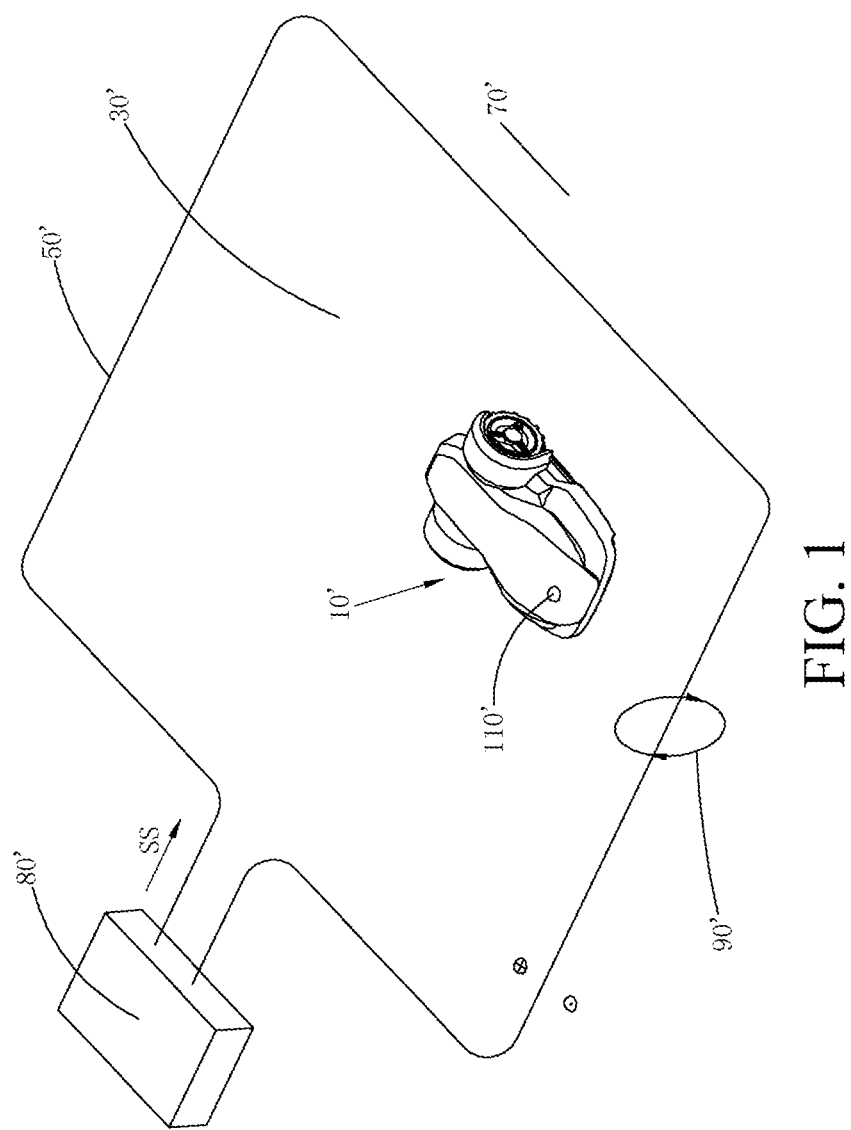
FIG. 1 is a schematic diagram of an automatic working system in prior art.
Figure 2:
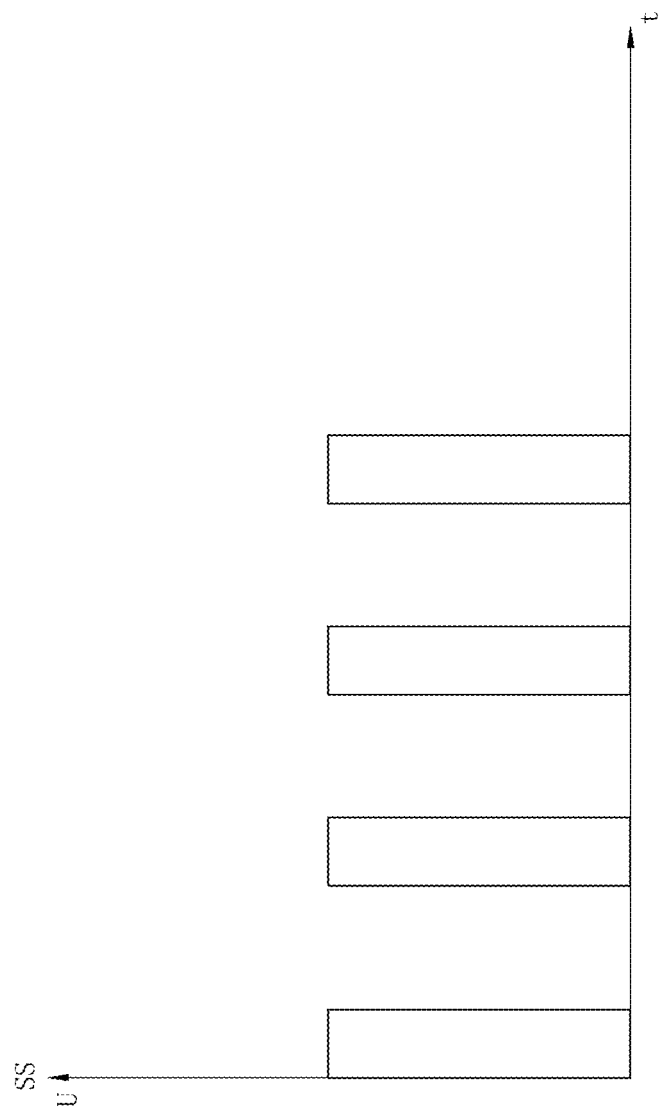
FIG. 2 is a schematic diagram of a current signal in the automatic working system as shown in FIG. 1.
Figure 3:
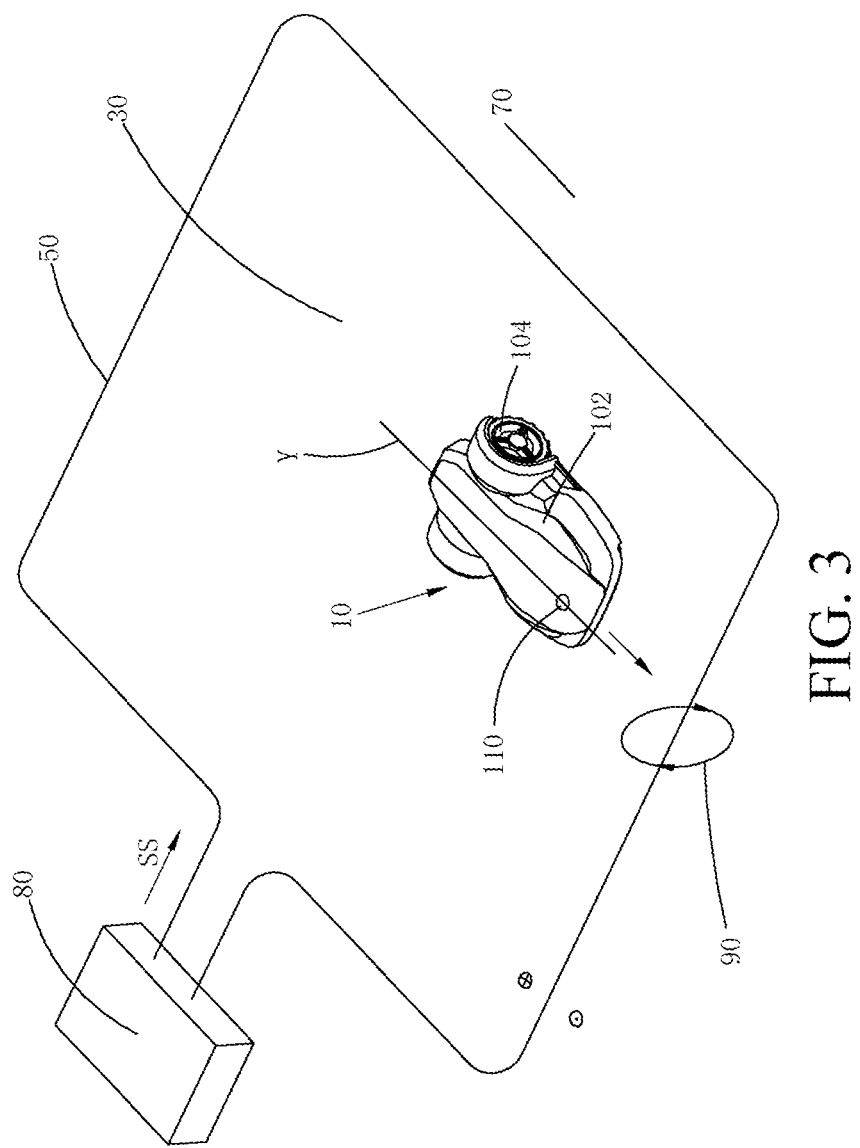
FIG. 3 is a schematic diagram of an automatic working system in an embodiment of the present invention.

The automatic working system as shown in FIG. 3 comprises a signal generating device 80, configured to generate a current signal SS; a boundary wire 50, forming an electric loop with the signal generating device 80, wherein the signal generating device 80 generates the boundary signal SS as shown in FIG. 2 and sends to the boundary wire 50, and the boundary signal SS generates a changed magnetic field 90 when flowing through the boundary wire 50. As known by those skilled in the art, the boundary signal SS can also adopt a periodic pulse voltage signal as not shown in FIG. 2, and other types of signal forms which can generate a changed magnetic field can also be adopted. The boundary wire 50 is used for dividing a specific region into an inside region and an outside region, wherein a range located in the boundary wire 50 is defined as a working region 30, and a range located outside the boundary wire 50 is defined as a non-working region 70.

Figure 4:
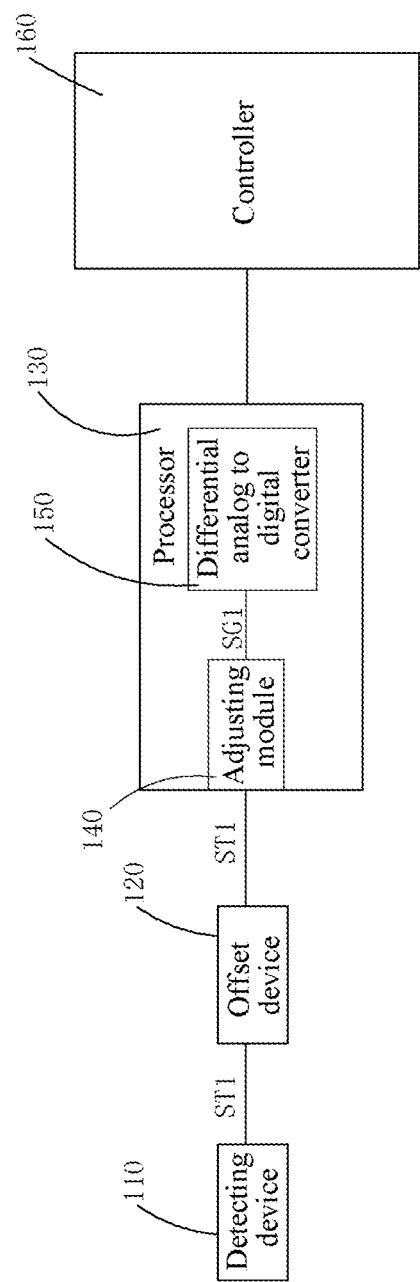
FIG. 4 is a module diagram of an automatic moving device in an embodiment of the present invention.

The automatic working system also comprises an automatic moving device 10, which automatically moves and works in the working region 30 planned by the boundary wire 50, the automatic moving device 10 comprises at least one detecting device, as shown in FIG. 4, the automatic moving device 10 comprises a detecting device 110, and also comprises an adjusting module 140 and a comparing module, wherein the comparing module is electrically connected to the adjusting module 140, and in one of the embodiments disposed in the processor 130, and can also be disposed outside the processor 130 according to needs and electrically connected to the processor 130; at least one detecting device 110 detects the electromagnetic field 50 to generate at least one detection signal; the adjusting module 140 amplifies the at least one detection signal to form at least one gain signal; the comparing module compares at least one extreme point of the gain signal with a preset condition, and the preset condition comprises that the extreme point is lower than an upper threshold value and higher than a lower threshold value; if the extreme point is higher than the upper threshold value, then the adjusting module 140 reduces an amplification factor of the gain signal, and if the extreme point is lower than the lower threshold value, then the adjusting module 140 increases an amplification factor of the gain signal, such that after adjusted, the formed gain signal accords with the preset condition.

The extreme point in the preset point comprises a peak value and/or a valley value. When at least one of the peak value or the valley value does not accords with the preset condition, the adjusting module 140 adjusts the amplification factor of the gain signal. In one of the embodiments, the preset condition is disposed in the processor 130, it is understandable that the preset condition can also be not disposed in the processor 130, is disposed in other positions of the automatic moving device, and is fed back into the processor 130 through a circuit. The preset condition is described in detail in the following text.

In one of the embodiments, the upper threshold value and the lower threshold value can be fixed values and can be adjusted according to different conditions.

The automatic moving device 10 can be an automatic or semi-automatic machine such as an intelligent mower, or a cleaning robot. In the following embodiment, the intelligent mower is taken as an example of the automatic moving device 10. As shown in FIG. 3, the automatic moving device 10 comprises a shell 102, a plurality of wheels 104 located on the bottom of the shell 102, a motor located in the shell 102 (not shown), and a processor and a controller which control the automatic moving device 10 to automatically work and automatically walk (not shown). As known by those skilled in the art, the quantity of the motors can be one or more, and the motor is configured to drive the wheels 104 to move or drive a working part (not shown) of the automatic moving device 10 to mow.

In one of the embodiments, the detecting device 110 of the automatic moving device 10 is an inductance coil. In order to better sense a change of the electromagnetic field 90, the inductance coil 110 is usually vertically disposed on the automatic moving device 10, such that an effective area of the electromagnetic field 90 sensed by the inductance coil 110 is the largest, the effective area is an area vertical to a direction of the magnetic field. Of course, the inductance coil can also be disposed on the automatic moving device 10 non-vertically, for example, disposed on the automatic moving device 10 by 75° and 45° and other different angles. No matter the inductance coil is disposed on the automatic moving device 10 in which angle, only the condition that the inductance coil has an effective area and can sense to generate the detection signal needs to be guaranteed.

Figure 5:
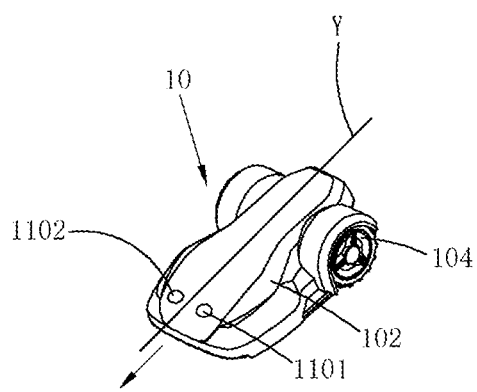
FIG. 5 is a schematic diagram of an automatic moving device in another embodiment of the present invention.

Of course, the automatic moving device 10 can comprise a plurality of detecting devices, which detect the electromagnetic field 90 to generate a plurality of corresponding detection signals respectively, as shown in FIG. 5, the automatic moving device 10 comprises a first detecting device 1101 and a second detecting device 1102. The first detecting device 1101 and the second detecting device 1102 respectively detect a change of the magnetic field 90 to generate a first detection signal and a second detection signal. The first detecting device 1101 and the second detecting device 1102 are respectively located at two sides of a middle axis Y of the automatic moving device 10, specifically symmetric about the middle axis Y for example. Of course, the first detecting device 1101 and the second detecting device 1102 can also be located in other positions of the automatic moving device 10. When the automatic moving device 10 has two charging docking terminals, the positions of the first detecting device 1101 and the second detecting device 1102 are symmetric about the middle axis of the two charging docking terminals. The first detecting device 1101 and the second detecting device 1102 are respectively located at different sides of the motor, specifically, for example, the first detecting device 1101 is located at the right side of the motor and the second detecting device 1102 is located at the left side of the motor.

When the automatic moving device 10 comprises more than or equal to two detecting devices, a specific position of each detecting device on the automatic moving device 10 can have many choices. Specifically, when the automatic moving device 10 comprises three detecting devices, two of which are located at left and right sides of the symmetric axis respectively, and the last detecting device is located at some point on the symmetric axis. The embodiments about the setting of the specific positions are too many and are not repeated in the description. The automatic moving device 10 having one detecting device is taken as an embodiment for detailed description in the following text.

In order to avoid the processing complexity of an analog signal, the present embodiment performs analog-digital conversion on the detected detection signal, and then adopts a digital signal processor to perform denoising. As known by those skilled in the art, if the analog-digital conversion is not performed, the denoising in the present embodiment can be realized by using a corresponding hardware circuit.

In combination with what is shown in FIG. 4, the detecting device 110 of the automatic moving device can be electrically connected to one offset device 120 as required, the offset device 120 can be electrically connected to a processor 130, which comprises a differential analog to digital converter 150 electrically connected to the adjusting module 140 and the comparing module and having a memory space, and the processor 130 also comprises a controller 160 electrically connected to the differential analog to digital converter 150. Those skilled in the art can understand that the differential analog to digital converter 150 can also not be provided with a memory, and the processor 130 is provided with the memory space for storing a digital signal. The type of the processor 130 is for example ST MICROPROCESSOR.

The detecting device 110 detects a signal in the environment to form a detection signal ST1, the signal in the environment comprises a boundary signal transmitted by the boundary wire and signals transmitted not by the boundary wire, and the signals transmitted not by the boundary wire mainly comprise interference signals of adjacent working systems and a noise interference signal in the environment, etc. According to different conditions, the offset device 120 can upward offset, downward offset or fix the whole of the detection signal ST1 relative to a zero point, in one determined embodiment, one of the manners is selected to process the detection signal ST1, it needs to be pointed out that when the detection signal ST1 is upward offset, downward offset or fixed relative to the zero point, the setting of numbers of the upper threshold value and the lower threshold value in the preset condition is also correspondingly moved according to movement of the detection signal, and the upper threshold value and the lower threshold value are described in detail in the following text. The detection signal ST1 through the offset device 120 is input to the adjusting module 140 and forms a gain signal SG1 through adjusting, the comparing module compares an extreme point of the gain signal SG1 with the preset condition, according to a comparing result, the adjusting module 140 adjusts an amplification factor of the gain signal SG1, such that the adjusted gain signal SG1 accords with the preset condition, the differential analog to digital converter 150 converts the gain signal SG1 accords with the preset condition into a digital signal SD1, the processor 130 also internally comprises a denoising module and a judging module, the denoising module removes an interference signal in the digital signal SD1 according to a denoising algorithm, for example, an interference signal of the adjacent system, a noise interference signal in the environment, an interference signal of the motor, etc., the judging module judges whether the detecting device 110 is in or outside the boundary wire based on the denoised digital signal SD1, and sends a moving signal to the controller 160, and the controller 160 drives the automatic moving device 10 to move based on the moving signal. Of course, the processor 130 can also not internally comprise the additional denoising module, and the interference signal is moved from the gain signal according with preset condition.

The controller 160 sends a corresponding control command to the automatic moving device 10 based on the moving signal sent from the processor 130. For example, when the detecting device 110 does not detect an effective signal, then the controller 160 does not send any action command, such that the automatic moving device 10 does not walk any more; when the detecting device 110 is in the non-working region, then the controller 160 sends a command to make the automatic moving device 10 get away from the non-working region. The specific control command is designed by a user or designer self according to different results obtained from processing, and therefore, a logic therein is not repeated.

In different embodiments, the processor 130 can adopt different extreme points to compare with the preset condition, for example, adopt a peak value of the gain signal SG1 to compare with the preset condition, or adopt a valley value of the gain signal SG1 to compare with the preset signal, such that the peak value or valley value of the gain signal SG1 accords with the preset condition, or the peak value and valley value of the gain signal SG1 are adopted to compare with the preset condition at the same time, and when one of the peak value and the valley value of the gain signal SG1 does not accord with the preset condition, the adjusting module 140 will adjust the gain signal SG1, such that the peak value and valley value of the gain signal SG1 accord with the preset condition at the same time.

Figure 6A:
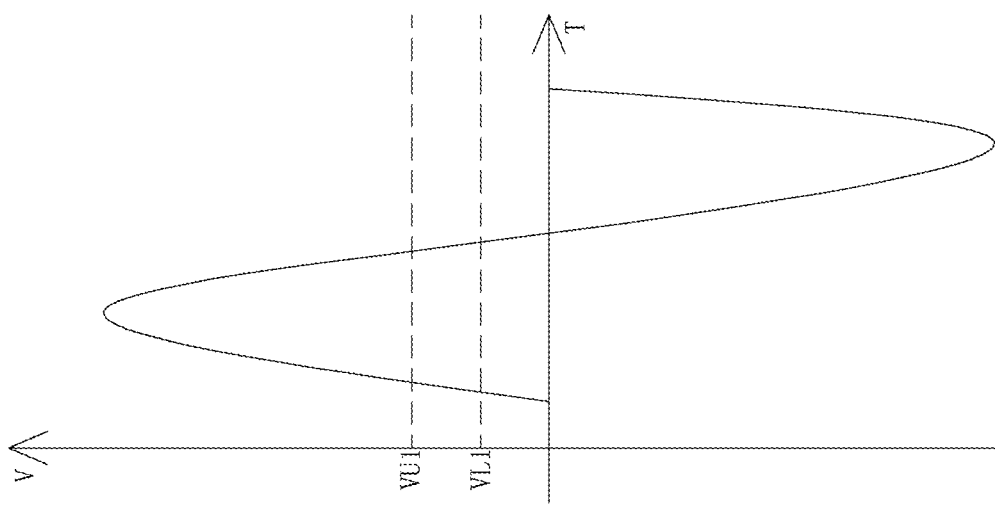
FIGS. 6a to 6c are schematic diagrams of reducing a first gain signal in an embodiment of the present invention.
Figure 6B:
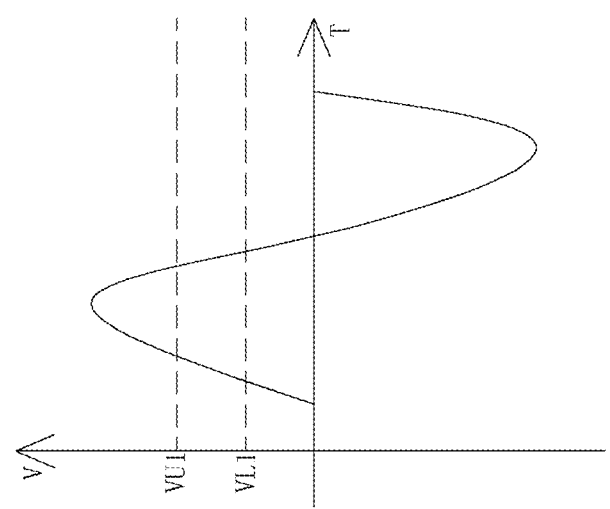
Figure 6C:
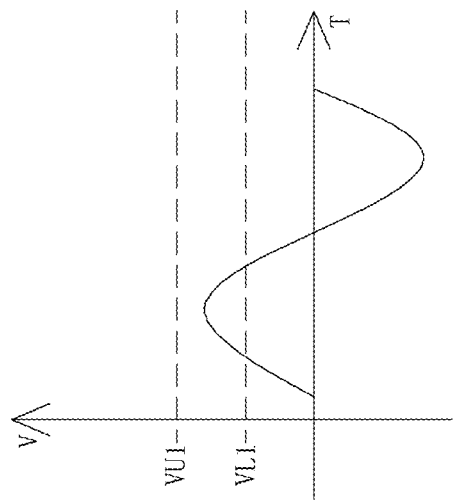

As shown in FIG. 6c, hereinafter, the comparison between the peak value of the gain signal SG1 and the preset condition is adopted as an example for description, the preset condition preset by the processor 130 comprises: in the direction of the peak value, a peak value Peak-Pos of the gain signal SG1 is higher than a lower threshold value VL1 and lower than an upper threshold value VU1.

As shown in FIGS. 6a-6c, after the comparing module compares, if the peak value Peak-Pos of the gain signal SG1 is higher than the upper threshold value VU1, then the adjusting module 140 reduces an amplification factor of the gain signal SG1, if the adjusted gain signal SG1 is still higher than the upper threshold value VU1, then the adjusting module 140 continues to reduce the amplification factor of the gain signal SG1 till the peak value Peak-Pos of the gain signal SG1 is lower than the upper threshold value VU1 and higher than the lower threshold value VL1.

Figure 7A:
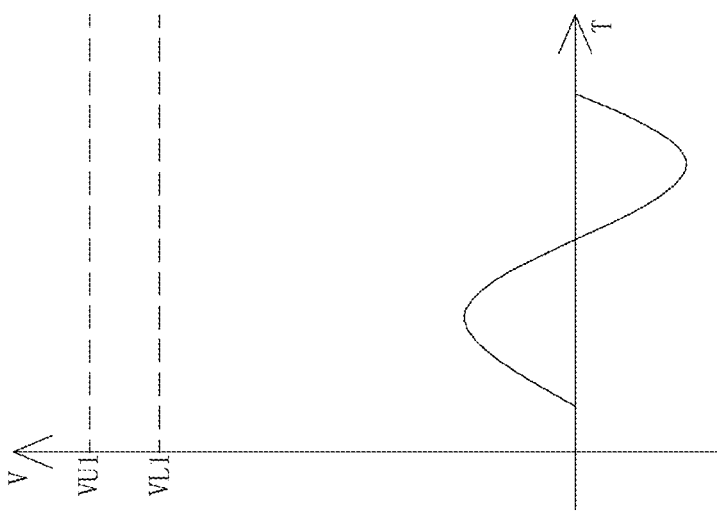
FIGS. 7a to 7c are schematic diagrams of increasing a first gain signal in an embodiment of the present invention.
Figure 7B:
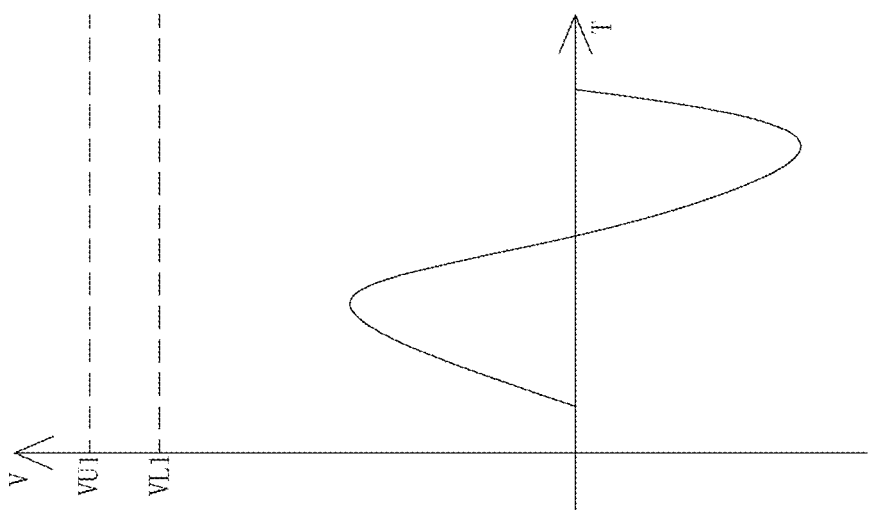
Figure 7C:
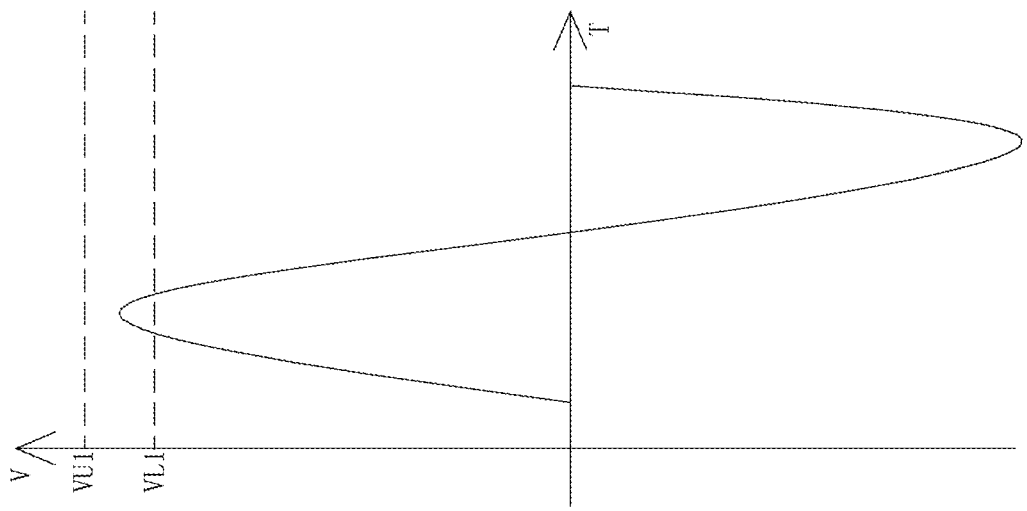

As shown in FIGS. 7a-7c, after the comparing module compares, if the peak value Peak-Pos of the gain signal SG1 is lower than the lower threshold value VL1, then the an amplification factor of the gain signal SG1 is increased, if the adjusted gain signal SG1 is still lower than the lower threshold value VL1, then the adjusting module 140 continues to increase the amplification factor of the gain signal SG1 till the peak value Peak-Pos of the gain signal SG1 is higher than the lower threshold value VL1 and lower than the upper threshold value VU1.

The process of adjusting the valley value Peak-Neg of the gain signal SG1 is similar to that of adjusting the peak value Peak-Pos of the gain signal SG1 and is not repeated herein.

Figure 8B:
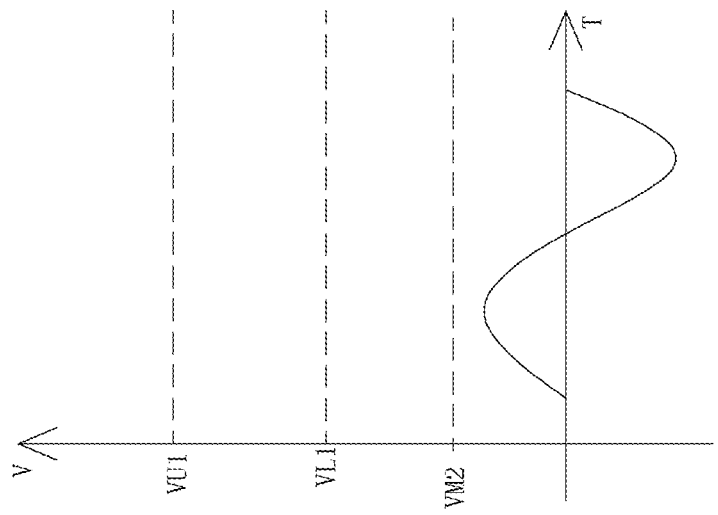
FIGS. 8a to 8b are schematic diagrams of comparing a gain signal and a sensitivity threshold value in an embodiment of the present invention.
Figure 8A:
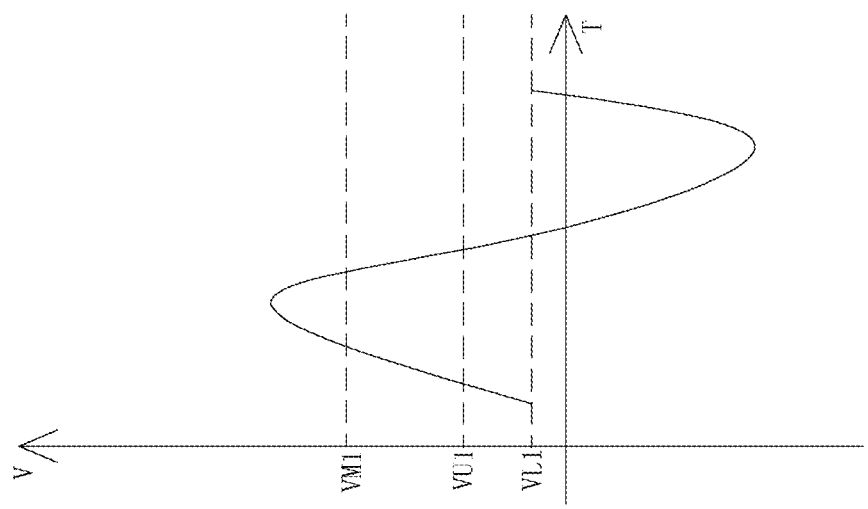

According to the embodiments of the present invention, a sensitivity threshold value can be disposed in the direction of the peak value Peak-Pos of the gain signal SG1 or the direction of the valley value Peak-Neg of the gain signal SG1, the quantity and position of the sensitivity threshold value are not defined, different quantities and different positions can be set according to an actual condition, as shown in FIG. 8a, for example, a first sensitivity threshold value VM1 is disposed in the direction of the peak value Peak-Pos of the gain signal SG1, if the peak value Peak-Pos of the gain signal SG1 is higher than the upper threshold value VU1 and also higher than the first sensitivity value VM1, then the adjusting module 140 can reduce the amplification factor of the gain SG1 by two times according to an internal algorithm to make the peak value Peak-Pos be lower than the upper threshold value VU1, if there is no first sensitivity threshold value VM1, then the adjusting module 140 reduces the gain signal SG1 by one time, after reduced by one time, if the peak value Peak-Pos is still higher than the upper threshold value VU1, the adjusting module 140 reduces the gain SG1 by one time again till the peak value Peak-Pos is lower than the upper threshold value VU1, due to the setting of the sensitivity threshold value, the adjusting module 140 can directly adjust the amplification factor accords with the preset condition instead of adjusting the gain signal SG1 level by level, such that the adjusting process of the adjusting module 140 is flexible and fast.

Similarly, as shown in FIG. 8b, in the direction of the peak value Peak-Pos of the gain signal SG1, a second sensitivity threshold value VM2 can be disposed below the lower threshold value VL1, and the amplification factor of the adjusting module 140 is decided according to a fact whether the peak value Peak-Pos is lower than the second sensitivity threshold value VM2 or intersected with the second sensitivity threshold value VM2 when lower than the lower threshold value VL1.

Therefore, according to the need of the adjusting process, the sensitivity threshold value can be disposed in different positions in the direction of the peak value of the gain signal SG1, and the quantity and position of the sensitivity threshold values are not limited.

In the direction of the valley value of the Peak-Neg of the gain signal SG1, the sensitivity threshold values of unlimited quantities and positions can be set according to different conditions, and it is similar to the setting principle in the direction of the peak value Peak-Pos of the gain signal SG1, and is not repeated herein.

In another embodiment of the present invention, the extreme point of the gain signal SG1 may not be directly adopted to compare with the preset condition, according to a preprocessing condition, a feature point of the gain signal SG1 is found, the feature point of the gain signal SG1 is adopted to compare with the preset condition, the preprocessing condition comprises that the feature point of the gain signal SG1 is a point in a function relation with the extreme point of the gain signal SG1, for example, the feature point is a point at a 2/3 position of the extreme point, a point at a 4/5 position of the extreme point or the extreme point, and the extreme point is a peak value or valley value of the gain signal SG1.

It can be understood that, when select the feature point which is in a function relation with an extreme point of the gain signal SG1 to compare with the preset condition, the preset condition of the feature point also make a corresponding adjustment according to the selected function relation. For example, when select the point at 2/3 times of an extreme point as the feature point, accordingly, set the upper threshold value VU1' and the lower threshold value VL1' as 2/3 times of the upper threshold value VU1 and the lower threshold value VL1, That is, the upper threshold value VU1' in preset condition of the feature point is 2/3VU1, the lower threshold value VL1' is 2/3VL1.

The setting of the adjusting module 140 has many implementing manners.

Figure 9:
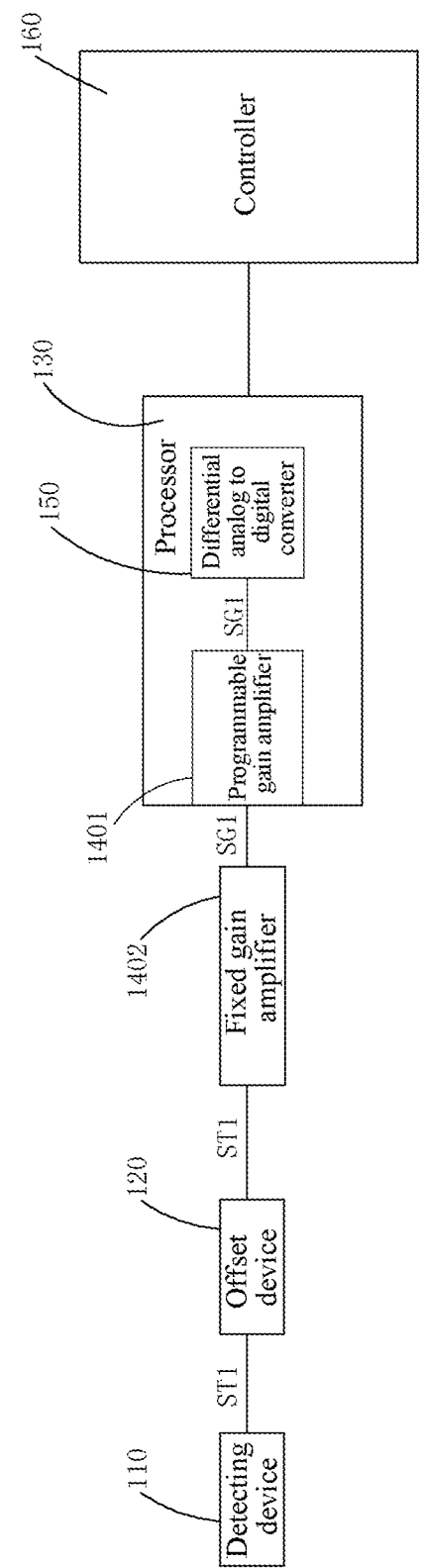
FIG. 9 is a module diagram of an automatic moving device in another embodiment of the present invention.

First manner: as shown in FIG. 9, the adjusting module 140 comprises a programmable gain amplifier (PGA) 1401 in a processor 130 and also comprises a fixed gain amplifier 1402, connected to the PGA 1401, outside processor 130, the amplification factor of the fixed gain amplifier 1402 is fixed, for example, a value between 100-200 times, such that the detecting device 110 can always detect the boundary signal in the working region, the PGA 1401 in the processor 130 automatically adjusts the gain signal SG1 amplified by the fixed gain amplifier 1402 according to a feedback of the adjusting module, such that the adjusted gain signal SG1 accords with the preset condition, therefore, the denoising step and the step of judging effectiveness of the gain signal SG1 are further performed according to needs.

The quantity of levels of the PGA 1401 can be one of 2-6, the amplification factor is ½ to 16 times that of the gain signal SG1, and the amplification factor is in the above range, such that after amplified, the gain signal SG1 can be sampled and received by the differential analog to digital converter 150 always, if the gain signal SG1 is amplified to much, then the gain signal may get out of the range of the input signal of the differential analog to digital converter 150.

In one of the embodiments, the quantity of the levels of the PGA 1401 are 5, and the amplification factor is ½ to 8 times of the gain signal, specifically, ½, 1, 2, 4 and 8 times.

Second manner: the adjusting module 1401 is a PGA, which is disposed in the processor 130, and the PGA automatically adjusts the amplification factor of the gain signal SG1 according to the feedback of the comparing module, such that the adjusted gain signal SG1 accords with the preset condition.

After it is ensured that the detection ST1 can be received, levels of the PGA can be one of 2-6, and the amplification factor is ½ to 16 times that of the gain signal SG1. In one of the embodiments, the quantity of the levels of the PGA are 5, and the amplification factor is ½ to 8 times of the gain signal, specifically, ½, 1, 2, 4 and 8 times.

Third manner: a difference from the second manner is that the PGA is disposed outside the processor, one end of the PGA is connected to an output end of an offset device 120, and the other end of the PGA is connected to an input end of the processor 130, and is not repeated herein.

Fourth manner: a difference from the first manner is that the fixed gain amplifier 1402 and the PGA 1401 are both disposed outside the processor 130, and are not repeated herein.

Figure 10:
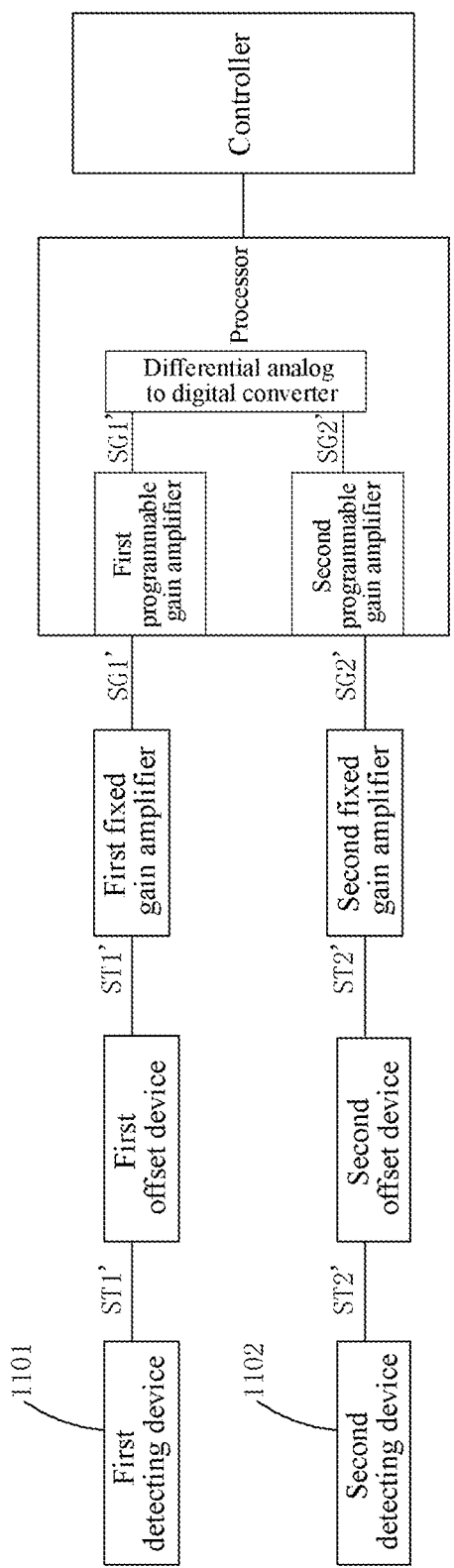
FIG. 10 is a module diagram of an automatic moving device in further embodiment of the present invention.

In combination what is shown in FIG. 10, when two detecting devices are adopted to detect the signal, the first detecting device 1101 and the second detecting device 1102 respectively detect the boundary signal to generate a first detection signal ST1' and a second detection signal ST2', the process flow of the first detection signal ST1' and that of the second detection signal ST2' are similar, therefore, the processing flow of any one of the first detection signal ST1' and the second detection signal ST2' is the same as that of the detection signal ST1 by adopting one detecting device 110, and the structure constitution and principle are similar, and are not repeated herein.

Figure 11B:
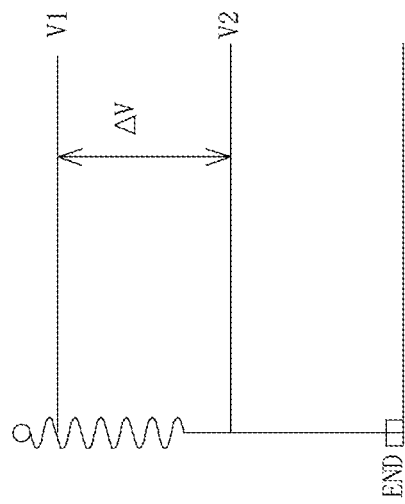
FIGS. 11a to 11b are comparison diagrams of detection signals of a differential analog to digital converter and a common analog to digital converter in an embodiment of the present invention.
Figure 11A:
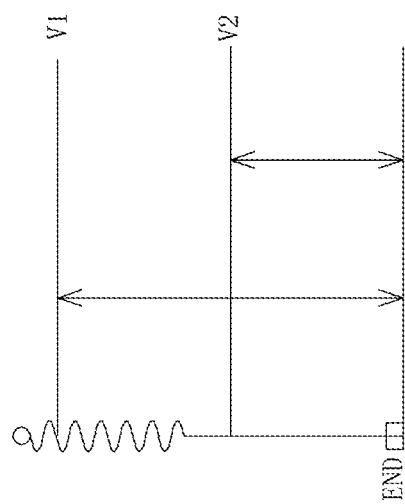

The variety of the analog to digital converter of the embodiments of present invention is not limited, a sampling manner is not limited, a common analog to digital converter or a differential analog to digital converter can be adopted, as shown in FIG. 11*a*, in the sampling process of the common analog to digital converter, a method of obtaining the detection signal of the detecting device comprises obtaining a voltage V1 of an inductance soil relative to a grounding end, then obtaining an interference voltage V2 of the detecting device relative to the grounding end, and V1 and V2 are subjected to a method of difference to obtain ΔV, which is a voltage value of the detection signal.

As shown in FIG. 11*b*, in the sampling process of the differential analog to digital converter 150, a method of obtaining the voltage value of the detection signal of the detecting device comprises: directly obtaining the differential value ΔV of V2 and V1, and the method is simple and can filter the interference of the grounding end.

A sampling frequency of the differential analog to digital converter 150 of the embodiments of the present invention is 50 KHz, the adjusted gain signal is sampled every 20 us to obtain a corresponding digital amplitude value, the differential analog to digital converter 150 can store 700 value points every time, the corresponding time is 14 ms, therefore, in the present embodiment, a processing period of a denoising control algorithm is 14 ms, that is, an index period corresponding to the digital signal is 700 points. As known by those skilled in the art, the processing period can be changed according to a used hardware or adding a limiting condition. Therefore, the processing period does not limit the embodiments of the present invention. The type of the differential analog to digital converter 150 of the present invention is for example SDADC. Other types of analog to digital converters can also be adopted.

An optimal filter is also disposed in the processor 130, can filter a harmonic signal different from the boundary signal 50 in frequency, and improves a signal to noise ratio to the greatest degree.

The automatic working system provided in the embodiments of the present invention can filter the interference signal weaker than the boundary signal according to the setting of the upper threshold value and the lower threshold value to achieve the denoising aim, other denoising modules can also be disposed in the processor 130 as required, for example, the automatic working system can be combined with a product algorithm described in the international patent application with an application number PCT/CN2016/104718 for use, and the interference signal can be filtered to the greatest degree by combined use. A specific algorithm described in this patent application document is not repeated.

The effective signal output from the processor 130 can be used for judging that the automatic moving device 10 is in or outside the working region, and a distance between the automatic moving device and the boundary wire can be judged by using the strength of the effective signal. Further, by means of the distance between the automatic moving device and the boundary wire, a working route of the automatic moving device or a route of returning back to the charging station is planned, therefore, and a damage to a lawn is avoided.

The anti-interference capacity of the automatic working system of the embodiments of the present invention is effectively improved, therefore, the automatic working system is not only suitable for a small range working region, but also suitable for a large range working region (for example, an area of the working region 30 is larger than 4000 square meter).

The above embodiments are merely plural embodiments of the present invention, are specifically described in detail, but shouldn't be understood as a limitation to a protective scope of the present invention. It should be pointed out that without departing from a concept of the present invention, those skilled in the art can make a plurality of transformations and improvements, which all fall within the protective scope of the present invention. Therefore, the protective scope of the present invention patent takes appended claims as a criterion.

What is claimed is:

1. A control method of an automatic working system, said automatic working system comprises: a signal generating device (80) for generating a current signal, said current signal generating an electromagnetic field when flowing through a boundary wire (50); and an automatic moving device (10), said automatic moving device (10) having at least one detecting device for detecting said electromagnetic field; wherein comprising the following steps:
   detecting said electromagnetic field, and generating at least one detection signal;
   amplifying said at least one detection signal to form at least one gain signal;
   determining a feature point of said gain signal according to a preprocessing condition, said preprocessing condition comprising that said feature point is a point in a function relation with an extreme point of said gain signal;
   comparing said at least one feature point with a preset condition, wherein said preset condition comprising a range of an input signal of a differential analog to digital converter, that said range comprises an upper threshold value and a lower threshold value;
   if said feature point is higher than said upper threshold value, then reduce an amplification factor of said gain signal, if said feature point is lower than said lower threshold value, then increase an amplification factor of said gain signal, such that said gain signal formed after adjusting accords with said preset condition.

2. The control method of an automatic working system according to claim 1, wherein said feature point comprises an extreme point of said gain signal, and said extreme point comprises a peak value and/or a valley value.

3. The control method of an automatic working system according to claim 2, wherein when one of said peak value or said valley value does not accord with said preset condition, then adjust said amplification factor of said gain signal.

4. The control method of an automatic working system according to claim 1, wherein after said gain signal according with said preset condition is output, further comprising an analog to digital conversion step for converting said gain signal into a digital signal.

5. The control method of an automatic working system according to claim 4, wherein after said digital signal is formed, further comprising a denoising step for removing an interference signal of said digital signal.

6. The control method of an automatic working system according to claim 5, wherein after said denoising step, further comprising a judging step, for judging that said detecting device is in or outside said boundary wire based on a denoised digital signal and forming at least one moving signal, and after said judging step, further comprising a driving step for driving said automatic moving device to move according to said at least one moving signal.

7. An automatic working system, comprising:
a signal generating device (80), configured to generate a current signal;
a boundary wire (50), forming an electric loop with said signal generating device (80), said current signal flowing through said boundary wire (50) to generate an electromagnetic field;
an automatic moving device (10), automatically moving and working in a working region (30) defined by said boundary wire (50), wherein,
said automatic moving device (10) comprising at least one detecting device, further comprising an adjusting module (140) and a comparing module;
said at least one detecting device detects said electromagnetic field to generate at least one detection signal, and said adjusting module amplifies said at least one detection signal to form at least one gain signal;
determining a feature point of said gain signal according to a preprocessing condition, and said preprocessing condition comprises that said feature point is a point in a function relation with an extreme point of said gain signal;
said comparing module compares said at least one feature point with a preset condition, wherein said preset condition comprising a range of an input signal of a differential analog to digital converter, that said range comprises an upper threshold value and a lower threshold value;
if said feature point is higher than said upper threshold value, then said adjusting module reduces an amplification factor of said gain signal, if said feature point is lower than said lower threshold value, then said adjusting module increases an amplification factor of said gain signal, such that said gain signal formed after adjusting accords with said preset condition.

8. The automatic working system according to claim 7, wherein said feature point comprises an extreme point of said gain signal, and said extreme point comprises a peak value and/or a valley value; when one of said peak value or said valley value does not accord with said preset condition, said adjusting module adjusts said amplification factor of said gain signal.

9. The automatic working system according to claim 7, wherein said automatic moving device further comprises a processor (130) for processing said at least one gain signal, and said preset condition is disposed in said processor (130).

10. The automatic working system according to claim 9, wherein said comparing module, said adjusting module, said analog to digital converter, said denoising module and said judging module are integrated in said processor.

11. The automatic working system according to claim 7, wherein said adjusting module comprises a programmable gain amplifier.

12. The automatic working system according to claim 11, wherein said adjusting module comprises a fixed gain amplifier.

13. The automatic working system according to claim 11, wherein a level of the amplification factor of said programmable gain amplifier are one of 2-6 levels.

14. The automatic working system according to claim 11, wherein said amplification factor of said programmable gain amplifier is ½ to 16 times of said gain signal.

15. The automatic working system according to claim 7, wherein an analog to digital converter is electrically connected to said adjusting module, configured to convert said gain signal into a digital signal.

16. The automatic working system according to claim 15, wherein a denoising module is electrically connected to said analog to digital converter, configured to remove an interference signal of said digital signal.

17. The automatic working system according to claim 16, wherein a judging module is electrically connected to said denoising module, configured to judge that said detecting device is in or outside said boundary wire based on a denoised digital signal and then forms at least one moving signal.

18. The automatic working system according to claim 17, wherein a controller is electrically connected to said judging module, configured to receive said moving signal to drive said automatic moving device to move.

19. The automatic working system according to claim 7, wherein said at least one detecting device comprises a first detecting device (1101) and a second detecting device (1102); said first detecting device (1101) and said second detecting device detect (1102) said electromagnetic field to generate a first detection signal and a second detection signal respectively; said adjusting module (140) amplifies said first detection signal and said second detection signal to form a first gain signal and a second gain signal respectively, said comparing module compares said first gain signal and said second gain signal with said preset condition respectively, and said adjusting module adjusts an amplification factor of said first gain signal and said second gain signal respectively according to a comparing result.

20. An automatic moving device, wherein comprising:
at least one detecting device, at least one fixed gain amplifier, further comprising an adjusting module and a comparing module;
said at least one detecting device detects electromagnetic field to generate at least one detection signal, said at least one fixed gain amplifier amplifies said at least one detection signal to form at least one gain signal;
determining a feature point of said gain signal according to a preprocessing condition, said preprocessing condition comprises that said feature point is a point in a function relation with an extreme point of said gain signal;
said comparing module compares said at least one feature point with a preset condition, wherein said preset condition comprising a range of an input signal of a differential analog to digital converter, that said range comprises an upper threshold value and a lower threshold value;
if said feature point is higher than said upper threshold value, then said adjusting module reduces an amplification factor of said gain signal, if said feature point is lower than said lower threshold value, then said adjusting module increases an amplification factor of said gain signal, such that said gain signal formed after adjusting accords with said preset condition.

* * * * *